(12) United States Patent
Shafer

(10) Patent No.: US 10,663,112 B2
(45) Date of Patent: May 26, 2020

(54) AUTOMATIC GREASE DISPENSING SYSTEM

(71) Applicant: Industrial Robot Supply, Inc., Greenville, PA (US)

(72) Inventor: Erik S. Shafer, Greenville, PA (US)

(73) Assignee: INDUSTRIAL ROBOT SUPPLY, INC., Greenville, PA (US)

( * ) Notice: Subject to any disclaimer, the term of this patent is extended or adjusted under 35 U.S.C. 154(b) by 491 days.

(21) Appl. No.: 15/351,533

(22) Filed: Nov. 15, 2016

(65) Prior Publication Data

US 2018/0135802 A1 May 17, 2018

(51) Int. Cl.
*F16N 23/00* (2006.01)
*F16N 13/16* (2006.01)
*F16N 19/00* (2006.01)
*F16N 11/00* (2006.01)

(52) U.S. Cl.
CPC .............. *F16N 23/00* (2013.01); *F16N 11/00* (2013.01); *F16N 13/16* (2013.01); *F16N 19/003* (2013.01); *F16N 2270/70* (2013.01)

(58) Field of Classification Search
CPC .......... F16N 23/00; F16N 11/00; F16N 13/16; F16N 19/003; F16N 2270/70
See application file for complete search history.

(56) References Cited

U.S. PATENT DOCUMENTS

| 2,903,014 | A | * | 9/1959 | Sheppard | F02M 59/462 137/512 |
| 3,149,697 | A | * | 9/1964 | Bendeich | F16N 21/02 137/539 |
| 4,016,897 | A | * | 4/1977 | Asioli | F16N 23/00 137/107 |
| 4,113,061 | A |  | 9/1978 | Peaster | |
| 4,496,030 | A |  | 1/1985 | Gloviak | |
| 4,787,827 | A | * | 11/1988 | Hinkle | F16N 37/00 184/105.1 |
| 5,544,791 | A | * | 8/1996 | Chih | F16N 13/10 222/262 |
| 5,570,868 | A | * | 11/1996 | Flaming | F04B 53/18 184/29 |
| 5,598,902 | A |  | 2/1997 | Lin | |
| 6,622,824 | B2 | * | 9/2003 | Roehrborn | F16N 7/38 184/6.1 |

(Continued)

*Primary Examiner* — Michael R Mansen
*Assistant Examiner* — Robert T Reese
(74) *Attorney, Agent, or Firm* — Blynn L. Shideler; Krisanne Shideler; BLK Law Group

(57) ABSTRACT

An automatic grease dispensing system for supplying grease to at least one destination includes a grease container, at least one drive cylinder configured for reciprocating motion, a pump cylinder coupled to and driven by each drive cylinder, wherein the pump cylinder includes an inlet in fluid communication with grease in the grease container and an outlet in fluid communication with one destination to be supplied with grease, a first one way check valve coupled to each inlet configured to allow grease to flow from the grease container to the pump cylinder and configured to prevent grease to flow from the pump cylinder to the grease container, and a second one way check valve coupled to each outlet configured to allow grease to flow from the pump cylinder to the one destination and configured to prevent grease to flow from the destination to the pump cylinder.

20 Claims, 3 Drawing Sheets

(56) References Cited

U.S. PATENT DOCUMENTS

| | | | |
|---|---|---|---|
| 6,802,394 B2 | 10/2004 | Patterson | |
| 2007/0090129 A1* | 4/2007 | Montgomery | F16N 3/12 222/186 |
| 2012/0067440 A1* | 3/2012 | Gurney | F16K 15/183 137/528 |
| 2013/0277148 A1* | 10/2013 | Beck | F16N 29/02 184/6.4 |
| 2016/0016737 A1* | 1/2016 | Tisserand | F16N 11/00 184/15.2 |
| 2016/0169446 A1* | 6/2016 | Peters | F16N 3/12 222/1 |
| 2016/0208983 A1* | 7/2016 | Moilanen | F16N 13/06 |
| 2016/0290848 A1* | 10/2016 | Conley | F16N 31/00 |

* cited by examiner

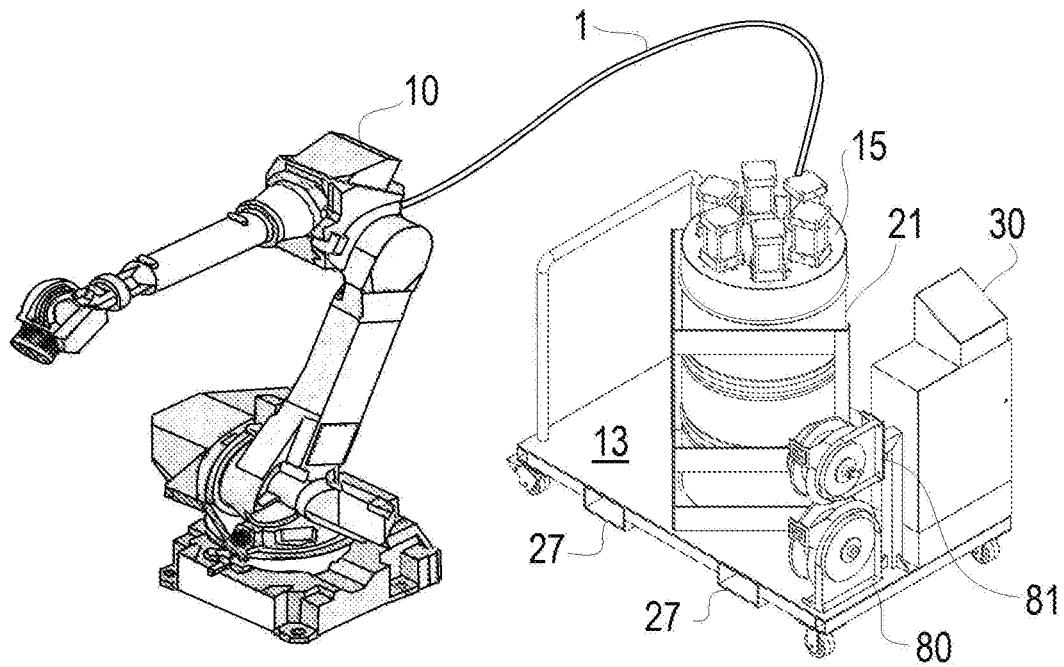
FIGURE 1
FIGURE 2
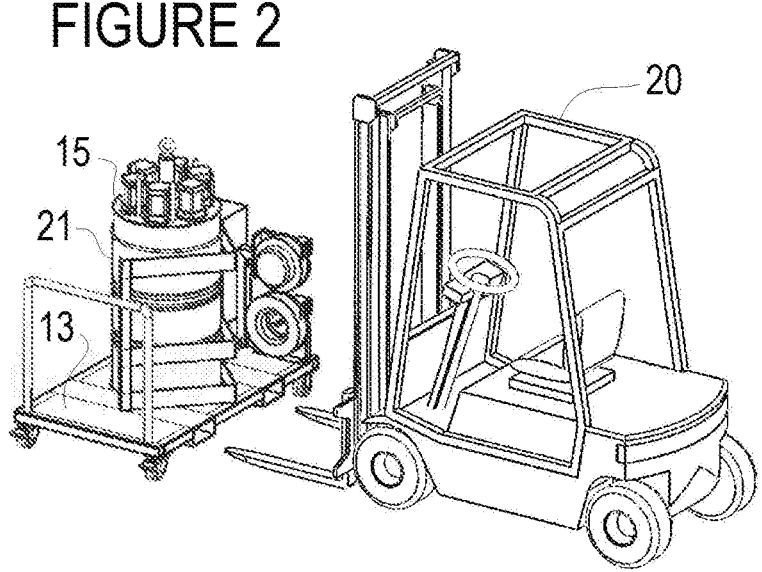

AUTOMATIC GREASE DISPENSING SYSTEM

BACKGROUND OF INVENTION

The invention relates to the lubrication of articulated connections for industrial machinery, robots and particularly industrial robots employed in manufacturing processes.

Machinery and robots used in manufacturing require periodic lubrication at specific non-rigid connection points (namely RV reducers and Harmonic Drives) in order to prevent catastrophic failure and ensure trouble free operation for extended periods of time. This is typically accomplished by a manual process or a single-point application semi-automated process. This process, however, requires and operator to set up and apply the lubricant without control of flow or volume at each individual location. This can take a significant amount of time due to having to perform multiple set-ups and is prone to operator error or inaccuracies such as over-pressurizing the cavity causing grease to penetrate into motor seals and damage RV and Harmonic seals. Additionally, the controlled method of greasing ensures an even fill and purge of the grease cavity, allowing old grease to be pushed out of the cavity vent by the new grease being pushed in. This controlled speed does not create a channel of least resistance through the old grease within the cavity.

SUMMARY OF INVENTION

Disclosed herein is an apparatus for attaching a single or multiple lubrication flow lines to each joint or rotating axis grease fitting and supply a pre-programmable amount of lubricant in a controlled and efficient manner. It comprises generally of a series of actuators and one-way flow or check valves to disperse the lubricant with accuracy and control. The apparatus is connected in such a way to supply a controlled velocity and flow of lubricant so as to displace the existing and used lubricant. In addition, operator time and human error is eliminated.

DESCRIPTION OF THE DRAWINGS

FIG. 1 is a perspective view, showing the general configuration of the present invention.

FIG. 2 is a perspective view, showing general configuration of the present invention being transported by a forklift for mobility.

PREFERRED EMBODIMENT

Referring to the Figures, wherein like numerals indicate like or corresponding parts throughout the several views, an exemplary robot is generally shown at 10 adjacent to the Lubricator System Cart 13. For purpose of illustration and not to be in any way limiting, the following description will make reference to robot 10. However, it will be appreciated that the invention is equally applicable to any machinery or style of robot requiring lubrication at one or multiple locations.

Figure 3:
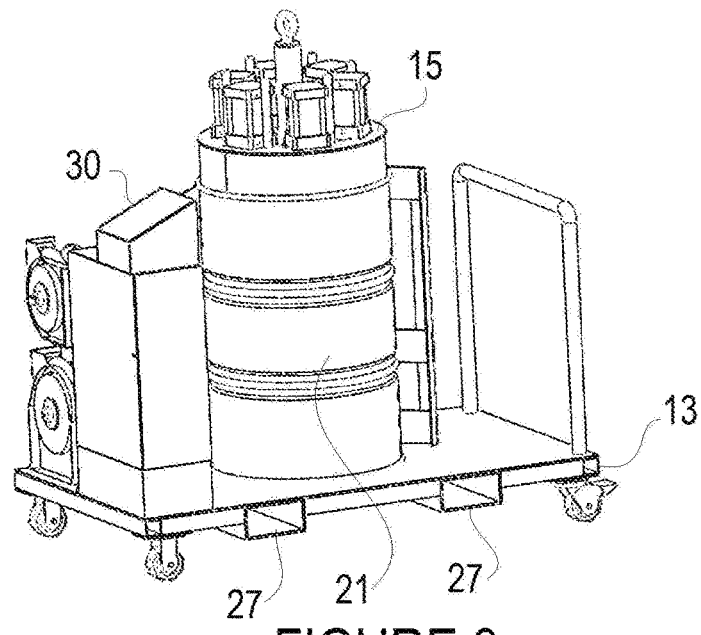
FIG. 3 is a perspective view, showing general configuration of the pneumatic cylinders connected together forming a pumping system.

The Lubricator System Cart 13 is an example of a cart in which the lubricator assembly 15 is shown and comprised of components to easily transport the invention. The specific type of rolling cart or transportation device is not important for this invention. FIGS. 2-3 show common methods to transport cart from one location to the next.

Referring now to FIG. 1, a typical robot 10 is connected to the cart 13 through single or multiple flexible delivery lines 1 from each lubricator assembly 15 to lubrication points on robot 10.

The means in which a lubricating substance is dispersed from lubricating assembly 15 to robot 10 is shown in FIG. 3. The subject invention is comprised of a series of cylinders partially or fully submersed in a container of lubricant container 21. The pump system 15 is shown partially on top of container 21 while there are additional components fully submersed in the substance.

Figure 4:
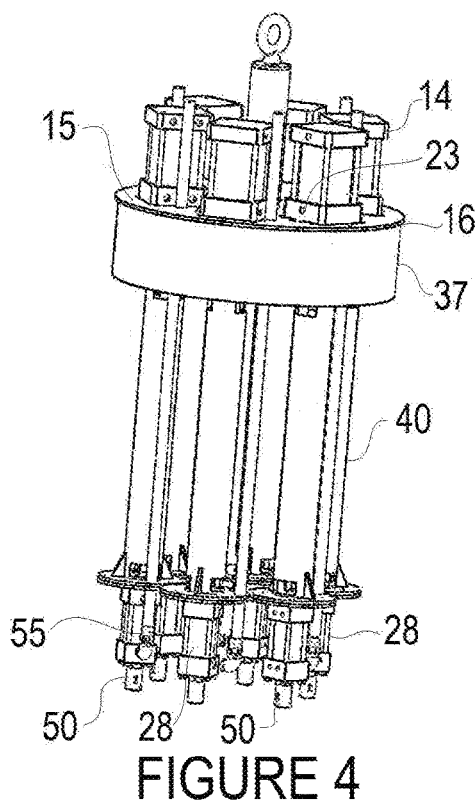
FIG. 4 is a perspective view, showing general configuration of individual components of the pneumatic cylinders connected together forming a pumping system.
Figure 5:
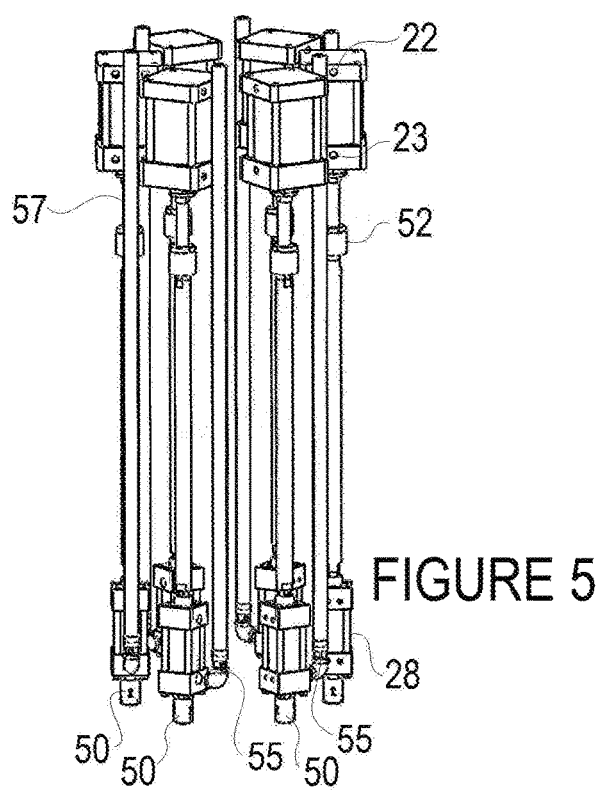
FIG. 5 is a perspective view showing general configuration of individual components of the automatic pumping system.
Figure 6:
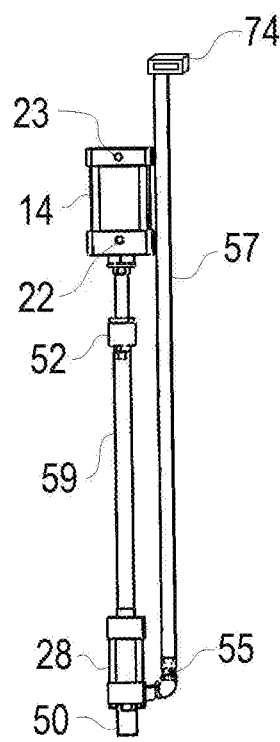
FIG. 6 is a perspective view, showing general configuration of a single cylinder pump system.

Referring to FIG. 4, the bottom cylinders 28 re used to vacuum the lubricant. The primary or drive pumps 14 are supported by flange 16 and atop an open cavity 37 to allow room for expansion from container as volume is displaced. The drive cylinder 14, as shown in FIG. 6, can generate linear motion by means of air pressure. As air is applied to port 22, the internal piston moves in such a way to increase cylinder volume inside cylinder 14. When air is applied to port 23, the piston moves in such a way to decrease cylinder volume. The decrease in cylinder volume also translates the external shaft outward, away from cylinder. In the preferred embodiment, this pneumatic cylinder is connected to a second and similar pneumatic cylinder by means of a coupler 52 and shaft 59.

The second pneumatic cylinder 28 is driven by cylinder 14. As the piston and shaft in the cylinder 14 moves in a specific direction, the shaft in cylinder 28 follows the same path of motion. As the internal piston in cylinder 28 decreases volume, this causes negative pressure and draws or sucks the substance into the internal cylinder. The preferred embodiment includes a one-way check valve 50 and 55 to control flow in the proper direction.

After which material is drawn into cylinder 28 through the valve assembly 50, the air is then applied to port 22 on cylinder 14. When the air is supplied to port 22, the piston in cylinder 28 translates and forces the lubricant through valve assembly 55 out of the container 21 and to the robot 10.

The preferred embodiment in FIG. 6 includes the one-way check valve 55 in series to permit the proper flow of lubricant. The one-way check valves 50 prevent material from being pushed back into the storage container drum 21. Pressure switch 74 monitors the pressure of lubricant for filling the bearing cavity.

FIG. 6 shows a general representation a drive cylinder 14 connected to pump cylinder 28 connected by coupler 52 and drive shaft 59.

Figure 7:
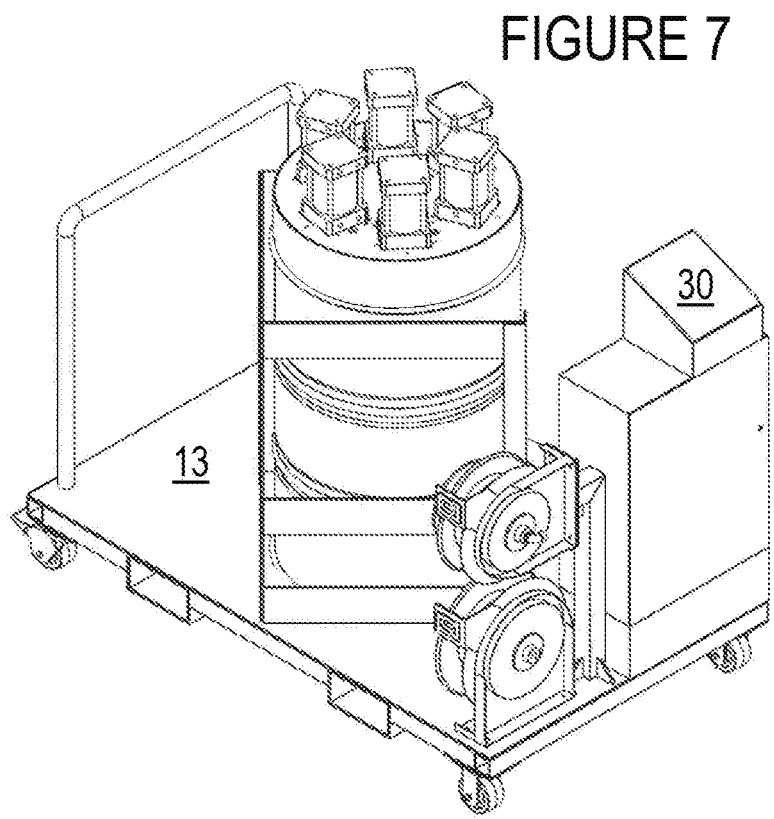
FIG. 7 is a perspective view, showing general configuration of Programmable Controls used to control the automation of the pumping system.

FIG. 7 shows the general configuration of a control panel to program a specific volume of fluid for each lubrication point based on specifications. The controls system is comprised of a programmable logic controller and an HMI. Electronic analog pressure sensors are utilized as a "permissive" in such that if a certain programmed pressure is exceeded, the system will reverse that corresponding air cylinder via a solenoid valve to immediately cease grease from being pumped. This prevents over-pressurizing the grease cavity. The HMI system can be programmed with "recipes" that correspond with models of robots being serviced. This can be saved and referenced for all future use. All aspects of the pump operation from timers to pressure readings can be altered by the user from within the HMI. A load cell is utilized to measure the overall weight of the grease drum, and it is electronically monitored by the PLC system so that it can notify the operator of low grease or empty. This is tied to a stack light for visible indication.

The invention has been described in an illustrative manner and it is to be understood that the terminology which has been used is intended to the nature of the words rather than of limitation. Obviously, many variations of the present invention are possible in regards to cylinder size, valve assembly sizes, lubrication types and controls. It is, therefore, to be understood that within the scope of the appended claim, the invention may be practiced otherwise than as specifically described. The invention is defined by the claim.

What is claimed:

1. An automatic grease dispensing system for supplying grease to at least one destination, comprising:
   a single grease container;
   a plurality of drive cylinders configured for reciprocating motion;
   a plurality of pump cylinders extending into and at least partially submerged within the single grease container, wherein each pump cylinder is coupled to and driven by one of said plurality of drive cylinders, wherein each pump cylinder includes an inlet in fluid communication with grease in the single grease container and an outlet in fluid communication with one destination to be supplied with grease;
   a first one way check valve coupled to each inlet of each of the plurality of pump cylinders configured to allow grease to flow from the single grease container to the respective pump cylinder and configured to prevent grease to flow from the said pump cylinder to the single grease container; and
   a second one way check valve coupled to each outlet of each of the plurality of pump cylinders configured to allow grease to flow from the respective pump cylinder to the said one destination and configured to prevent grease to flow from the said destination to the said pump cylinder.

2. The automatic grease dispensing system according to claim 1 further including at least one flexible line extending from each of the said outlets of said pump cylinders to at least one destination of said pump cylinder to be supplied with grease.

3. The automatic grease dispensing system according to claim 1, wherein each of said drive cylinders is independent of the remaining drive cylinders.

4. The automatic grease dispensing system according to claim 3 wherein each of said drive cylinders is associated with a single, distinct destination of the said at least one destinations to be supplied with grease via a one of said at least one pump cylinder driven by each said drive cylinder.

5. The automatic grease dispensing system according to claim 4 wherein the said single grease container is an open top container.

6. The automatic grease dispensing system according to claim 5 wherein the plurality of drive cylinders are suspended above the open top grease container.

7. The automatic grease dispensing system according to claim 6 wherein the plurality of drive cylinders are supported on a flange resting on the open top grease container.

8. The automatic grease dispensing system according to claim 7 wherein each pump cylinder extends below the flange into the grease within the single grease container.

9. The automatic grease dispensing system according to claim 8 wherein six of the said drive cylinders are provided in an annular array within the open top grease container.

10. The automatic grease dispensing system according to claim 9 further including a programmable controller coupled to each of the plurality of drive cylinders for independently controlling and monitoring the grease delivery of each of the said pump cylinders.

11. The automatic grease dispensing system according to claim 10 further including at least one pressure switch positioned between the at least one second one way check valve and the said associated distinct destination.

12. The automatic grease dispensing system according to claim 11 further including coupling each pressure switch to the programmable controller which is configured to prevent grease flow to the associated destination from the pump cylinder above a present pressure threshold.

13. The automatic grease dispensing system according to claim 12 further including a load cell coupled to the single grease container and to the programmable controller to track the amount of grease in the single grease container.

14. The automatic grease dispensing system according to claim 13 further including a moveable cart supporting the single grease container.

15. An automatic grease dispensing system for supplying grease to a plurality of destinations, comprising:
    A single grease container;
    a series of independent drive cylinders configured for reciprocating motion;
    a separate pump cylinder extending into and at least partially submerged within the single grease container coupled to and driven by each of the said series of independent drive cylinders, wherein each of the said pump cylinders includes an inlet in fluid communication with grease in the single grease container and an outlet in fluid communication with one distinct destination of the plurality of destinations to be supplied with grease;
    a first one way check valve coupled to each inlet of each of said pump cylinders configured to allow grease to flow from the single grease container to the pump cylinder and configured to prevent grease to flow from the said pump cylinder to the single grease container; and
    a second one way check valve coupled to each outlet of each of said pump cylinders configured to allow grease to flow from the pump cylinder to the one destination and configured to prevent grease to flow from the said destination to the pump cylinder; and
    a programmable controller coupled to each drive cylinder for independently controlling and monitoring the grease delivery of each of the said pump cylinders.

16. The automatic grease dispensing system according to claim 15 further including at least one pressure switch positioned between at least one second one way check valve and the associated destination.

17. The automatic grease dispensing system according to claim 16 further including coupling each pressure switch to the programmable controller which is configured to prevent grease flow to the associated destination from the pump cylinder above a present pressure threshold.

18. The automatic grease dispensing system according to claim 15 further including a load cell coupled to the single grease container and to the programmable controller to track the amount of grease in the single grease container.

19. The automatic grease dispensing system according to claim 15 wherein the single grease container is an open top container and wherein the plurality of drive cylinders are suspended above the said open top grease container.

20. The automatic grease dispensing system according to claim 19 wherein six of said series of independent drive cylinders are provided in an annular array.

\* \* \* \* \*